(12) United States Patent
Flew et al.

(10) Patent No.: US 8,350,851 B2
(45) Date of Patent: Jan. 8, 2013

(54) RIGHT SIZING RESERVOIR MODELS

(75) Inventors: Stephen Richard George Flew, Swansea (GB); Sigurdur Vidar Jonsson, Jericho (GB); Michael John Williams, Ely (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 979 days.

(21) Appl. No.: 12/398,294

(22) Filed: Mar. 5, 2009

(65) Prior Publication Data

US 2010/0225647 A1 Sep. 9, 2010

(51) Int. Cl.
*G06T 15/00* (2011.01)
(52) U.S. Cl. ............ 345/420; 345/419; 345/428; 703/2; 703/4; 703/6; 703/9; 703/10
(58) Field of Classification Search .................. 345/419, 345/420, 428; 703/2, 4, 6, 9, 10
See application file for complete search history.

(56) References Cited

U.S. PATENT DOCUMENTS

| | | | |
|---|---|---|---|
| 6,106,561 A | 8/2000 | Farmer | |
| 6,230,101 B1 | 5/2001 | Wallis | |
| 6,388,947 B1 | 5/2002 | Washbourne et al. | |
| 6,693,631 B2 | 2/2004 | Hubeli et al. | |
| 6,823,297 B2 | 11/2004 | Jenny et al. | |
| 6,912,491 B1 | 6/2005 | Van Bemmel | |
| 7,248,259 B2 | 7/2007 | Fremming | |
| 7,584,086 B2 * | 9/2009 | Frankel | 703/10 |
| 7,684,967 B2 * | 3/2010 | Wallis et al. | 703/10 |
| 7,716,029 B2 * | 5/2010 | Couet et al. | 703/10 |
| 7,844,430 B2 * | 11/2010 | Landis et al. | 703/10 |
| 7,933,750 B2 * | 4/2011 | Morton et al. | 703/2 |
| 7,983,883 B2 * | 7/2011 | Chen et al. | 703/6 |
| 8,140,310 B2 * | 3/2012 | Fitzpatrick et al. | 703/10 |
| 2003/0216897 A1 | 11/2003 | Endres et al. | |
| 2004/0199329 A1 | 10/2004 | Stone | |
| 2005/0015231 A1 | 1/2005 | Edwards et al. | |
| 2005/0115711 A1 | 6/2005 | Williams et al. | |
| 2005/0203725 A1 * | 9/2005 | Jenny et al. | 703/10 |
| 2006/0265204 A1 | 11/2006 | Wallis et al. | |
| 2007/0010979 A1 | 1/2007 | Wallis et al. | |
| 2008/0040086 A1 | 2/2008 | Betancourt et al. | |
| 2008/0120076 A1 | 5/2008 | Thambynayagam et al. | |
| 2008/0167849 A1 * | 7/2008 | Hales et al. | 703/10 |
| 2008/0255816 A1 | 10/2008 | Neville | |

OTHER PUBLICATIONS

White, Christopher D. et al., "Identifying and Estimating Significant Geologic Parameters With Experimental Design," SPE Journal, Sep. 2001, pp. 311-324.
Schlumberger, "Ocean for Petrel 2007.2 release".
Schlumberger, "Petrel 2009—What's New," 2008.

(Continued)

*Primary Examiner* — Phu K Nguyen
(74) *Attorney, Agent, or Firm* — Colin L. Wier

(57) ABSTRACT

Disclosed herein are improved systems and methods for right sizing grid models for performing, for example, reservoir simulations. Implementations in accordance with the present disclosure may begin with a relatively fine scale grid model. Successive coarsening and resampling operations may be repeated until one or more characteristics of the coarsened grid model begin to unacceptably diverge from those of the fine scale model. Similarly, successive coarsening and upscaling operations may be performed until one or more characteristics of the coarsened grid model begin to unacceptably diverge from those of the previously-coarsened grid model. The resulting coarsened grid model may be suitably sized for reservoir simulations.

12 Claims, 6 Drawing Sheets

OTHER PUBLICATIONS

King, Michael J. et al., "Optimal Coarsening of 3D Reservoir Models for Flow Simulation," SPE International, 2005 SPE Annual Technical Conference and Exhibition, Oct. 9-12, 2005, pp. 1-15, SPE 95759, Dallas, Texas USA.

Schlumberger, "Petrel," Petrel* seismic-to-simulation software, Version 2007.1, Petrel VR Configuratin and user guide, 2000-2007, pp. 1-33.

United Kingdom Cabinet Office, "Archiving Geological and Reservoir Simulation Models—A Consultation Document".

Webb, Steve et al., "Enabling the "Big Loop" Consistent Geological and Simulation Models," Presentation at the AAPG Technical Conference and Exhibition, Apr. 4, 2007, Long Beach, California USA.

* cited by examiner

RIGHT SIZING RESERVOIR MODELS

CROSS-REFERENCE TO RELATED APPLICATIONS

This patent application is related to co-pending, commonly-owned U.S. patent application Ser. No. 12/398,253 entitled "Coarsening and Splitting Techniques" filed concurrently herewith on Mar. 5, 2009, which application is incorporated herein by reference.

BACKGROUND

Reservoir models, which may be used to predict fluid flow as well as hydrocarbon in place, can be built at a variety of scales, or cell sizes. Typically, a relatively "fine scale" model may be built in a geological modeling package, and may consist of many millions of cells. This model may then be "upscaled" to a relatively "coarse scale" model for use in, for example, dynamic reservoir simulation packages. Choosing the scale to build the geological model, and the scale at which to coarsen to during the upscaling process, are largely discretionary operations. The process of selecting the appropriate scales may involve trial-and-error iterations before appropriate scales are determined, consuming costly person-hours and computational resources. Therefore, although desirable results have been achieved using such conventional techniques, there is room for improvement.

BRIEF DESCRIPTION OF THE DRAWINGS

Various embodiments and aspects of the present disclosure may be described below with reference to the accompanying figures, in which the same or similar reference numbers may be used to reference like features and components.

DETAILED DESCRIPTION

Figure 1:
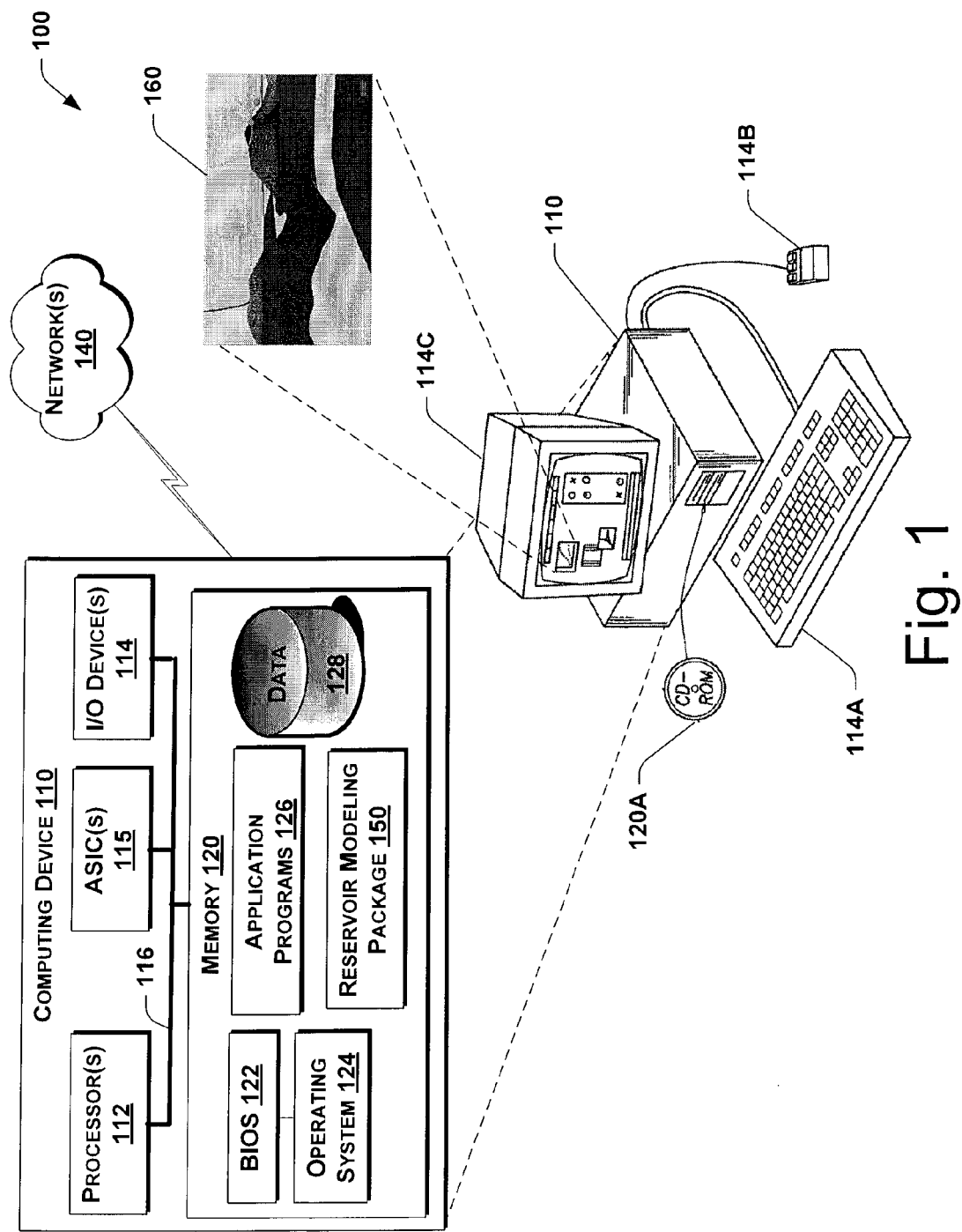
FIG. 1 illustrates an exemplary environment in which various embodiments of systems and methods in accordance with the teachings of the present disclosure can be implemented.

Disclosed herein are improved systems and methods for right sizing grid models for performing reservoir simulations. In at least some implementations, systems and methods in accordance with the present disclosure may begin with a relatively fine scale grid model. Successive coarsening and resampling operations may be repeated until one or more characteristics of the coarsened grid model begin to unacceptably diverge from those of the fine scale model. As described more fully below, such initial coarsening and resampling operations may advantageously preserve details of the underlying geological structure (e.g. rock type, etc.) over alternate techniques. Similarly, successive coarsening and upscaling operations may be performed until one or more characteristics of the coarsened grid model begins to unacceptably diverge from those of the previously-coarsened grid model. Such successive coarsening and upscaling operations may advantageously emphasize preservation of volumetric properties. Thus, the resulting coarsened grid model may be suitably sized for reservoir simulations.

As noted above, reservoir models may be used to predict fluid flow as well as hydrocarbon in place. Typically, a relatively "fine scale" model that may include many millions of cells may be built in a geological modeling package. This fine scale model may then be "upscaled" to a relatively "coarse scale" model for other purposes, including for use in dynamic reservoir simulations. Embodiments of systems and methods in accordance with the present disclosure may advantageously provide a framework to allow improved qualification or quantification (or both) of the scale at which to build the geological model, or may provide a means of illustrating the impacts of scale on the coarse model reservoir simulations.

In general, systems and methods in accordance with the present disclosure may begin with a relatively fine scale geological model. In some implementations, one or more coarsening and resampling operations may be performed, followed by additional coarsening and upscaling operations. More specifically, in some implementations, an areal coarsening is performed (while holding a third dimensional spacing constant), geological properties are "resampled" to the coarsened grid, a single dimension coarsening is performed (while holding the areal coarseness constant), and geological properties are resampled to the coarsened grid. These coarsening and resampling operations are repeated until the coarsened grid model begins to "drift away" or diverge from the fine scale model.

In further implementations, once the coarsening and resampling operations result in divergence, additional coarsening and "upscaling" operations may be performed using "upscaling" from the previously coarsened grid model (rather than the underlying fine scale model). Again, an areal coarsening may be performed (while holding a third dimensional spacing constant), properties may be upscaled to the coarsened grid, a single dimensional coarsening may be performed (while holding the areal coarseness constant), and properties may be upscaled to the coarsened grid model. These additional coarsening and upscaling operations are repeated until the coarsened grid model begins to "drift away" or diverge from the fine scale model. At that point, a suitably coarsened grid model for performing reservoir simulations is provided.

Systems and methods for sizing reservoir models in accordance with the teachings of the present disclosure may be implemented in a variety of computational environments. For example, FIG. 1 illustrates an exemplary environment 100 in which various embodiments of systems and methods in accordance with the teachings of the present disclosure can be implemented. In this implementation, the environment 100 includes a computing device 110 configured in accordance with the teachings of the present disclosure. In some embodiments, the computing device 110 may include one or more processors 112 and one or more input/output (I/O) devices 114 coupled to a memory 120 by a bus 116. One or more Application Specific Integrated Circuits (ASICs) 115 may be coupled to the bus 116 and configured to perform one or more desired functionalities described herein.

The one or more processors 112 may be composed of any suitable combination of hardware, software, or firmware to provide the desired functionality described herein. Similarly, the I/O devices 114 may include any suitable I/O devices, including, for example, a keyboard 114A, a cursor control device (e.g. mouse 114B), a display device (or monitor) 114C, a microphone, a scanner, a speaker, a printer, a network card, or any other suitable I/O device. In some embodiments, one or more of the I/O components 114 may be configured to operatively communicate with one or more external networks 140, such as a cellular telephone network, a satellite network, an information network (e.g. Internet, intranet, cellular network, cable network, fiber optic network, LAN, WAN, etc.), an infrared or radio wave communication network, or any other suitable network. The system bus 116 of the computing device 110 may represent any of the several types of bus structures (or combinations of bus structures), including a memory bus or memory controller, a peripheral bus, an accelerated graphics port, and a processor or local bus using any of a variety of bus architectures.

The memory 120 may include one or more computer-readable media configured to store data and/or program modules for implementing the techniques disclosed herein. For example, the memory 120 may host (or store) a basic input/output system (BIOS) 122, an operating system 124, one or more application programs 126, and program data 128 that can be accessed by the processor 112 for performing various functions disclosed herein.

The computing device 110 may further include a reservoir modeling package 150 in accordance with the teachings of the present disclosure. As depicted in FIG. 1, the reservoir modeling package 150 may be stored within (or hosted by) the memory 120. In alternate implementations, however, the reservoir modeling package 150 may reside within or be distributed among one or more other components or portions of the computing device 110. For example, in some implementations, one or more aspects of the reservoir modeling functionality described herein may reside in one or more of the processors 112, the I/O devices 114, the ASICs 115, or the memory 120.

In the following description, various techniques may be described in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media may include, but is not limited to, a random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information and which can be accessed by the computing device 110. Combinations of any of the above should also be included within the scope of computer readable media.

Moreover, the computer-readable media included in the system memory 120 can be any available media that can be accessed by the computing device 110, including removable computer storage media (e.g. CD-ROM 120A) or non-removable storage media. Computer storage media may include both volatile and nonvolatile media implemented in any method or technology for storage of information such as computer-readable instructions, data structures, program modules, or other data. Generally, program modules executed on the computing device 110 may include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

It will be appreciated that the computing device 110 is merely exemplary, and represents only one example of many possible computing devices and architectures that are suitable for use in accordance with the teachings of the present disclosure. Therefore, the computing device 110 shown in FIG. 1 is not intended to suggest any limitation as to scope of use or functionality of the computing device and/or its possible architectures. Neither should computing device 110 be interpreted as having any dependency or requirement relating to any one or combination of components illustrated in the example computing device 110.

Figure 2:
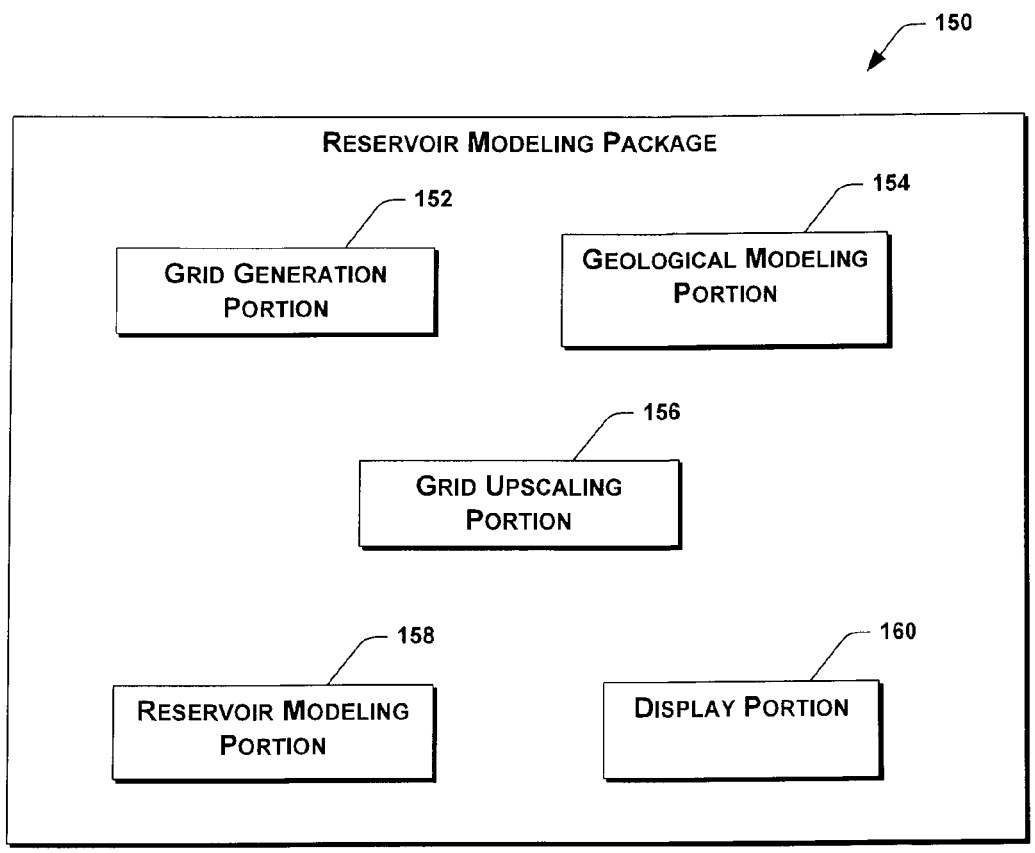
FIG. 2 is a schematic view of an exemplary reservoir modeling package in accordance with the teachings of the present disclosure.

FIG. 2 is a schematic view of the exemplary reservoir modeling package 150 of FIG. 1 in accordance with the teachings of the present disclosure. The reservoir modeling package 150 may be configured to develop reservoir simulation models that employ a coarsened or upscaled grid that is based on a relatively finer-scale grid developed for use with an underlying geological model. The details of various embodiments of such improved systems and methods for right sizing of reservoir models are described more fully below.

Figure 3:
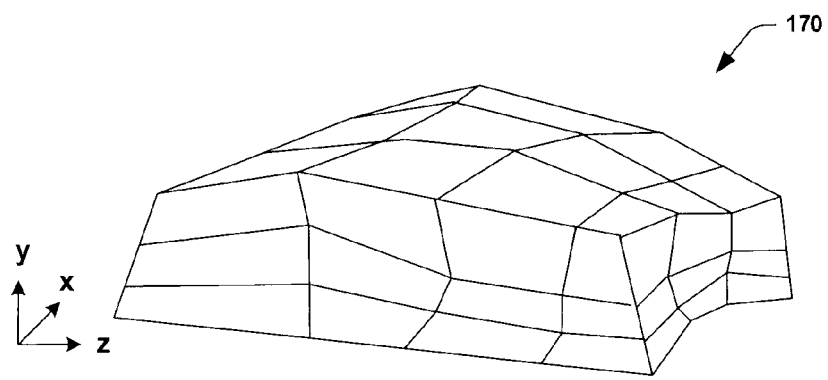
FIG. 3 is an isometric view of a portion of an exemplary grid model that may be generated by a grid generation portion of a reservoir modeling package in accordance with the teachings of the present disclosure.

As shown in FIG. 2, in some implementations, the reservoir modeling package 150 may include a grid generation portion 152, a geological modeling portion 154, a grid upscaling portion 156, a reservoir modeling portion 158, and a display portion 160. For illustrative purposes, a representative portion 170 of a three-dimensional grid generated by the grid generation portion 152 is shown in FIG. 3. Although a Cartesian coordinate axis system (x, y, z) is shown in FIG. 3, it should be appreciated that the cells in the grid need not be defined using a Cartesian system, and that in alternate embodiments, any suitable coordinate system for defining the cells of the grid may be used.

In general, unless otherwise stated herein, one or more of the components of the reservoir modeling package 150 depicted in FIG. 2 may be variously combined with one or more other components, or eliminated, to provide further possible embodiments of reservoir modeling packages in accordance with the teachings of the present disclosure. For example, in some embodiments, the grid generation portion 152 may be part of the geological modeling portion 154. Similarly, the display portion 160 may be part of the reservoir modeling portion 158, or the geological modeling portion 154, or any other portion of the reservoir modeling package 150. In further embodiments, either the grid generation portion 152, or the geological modeling portion 154, or both, may be separate from the reservoir modeling functionalities (i.e. eliminated from FIG. 2).

Also, it will be appreciated that, unless otherwise stated herein, one or more of the components of the reservoir modeling package 150 depicted in FIG. 2 may include (or be composed of) conventional components. For example, in some implementations, the geological modeling portion 154 may be a software package known as Petrel®, which is a software package commercially-available from Schlumberger Technology Corporation. Similarly, in some implementations, the grid generation portion 152 may be a grid generation package known as Flogrid®, or Petragrid, also available from Schlumberger. In some embodiments, the reservoir modeling portion 158 may be a conventional software package known as Eclipse®, which is another software package commercially-available from Schlumberger Technology Corporation. Unless otherwise specified, other conventional software tools may also be used in the reservoir modeling package 150, including those simulation, modeling, and display tools available from or produced by, for example, Gemini Solutions, Inc., BP, Chevron, Roxar, Texas A&M University, and any other suitable tools.

The preparation of fine-scale grids using the grid generation portion 152, and the geological modeling using the geological modeling portion 154, may be accomplished using generally known techniques and will not be described in detail herein. Similarly, the performance of reservoir simulations using the reservoir modeling portion 158, and the display of simulation and modeling results using the display portion 160, may also be accomplished using generally known techniques, and therefore will not be described in detail herein. Such known techniques include, for example, those techniques described in the following references and incorporated herein by reference: "Petrel Version 2007.1—Petrel VR Configuration and User Guide," by Schlumberger Technology Corporation (2007); "Archiving Geological and Reservoir Simulation Models—A Consultation Document," UK Department of Trade and Industry, (2004); "Optimal Coarsening of 3D Reservoir Models for Flow Simulation," by King et al., SPE (Society of Petroleum Engineering) 95759 (October 2005); "Top-Down Reservoir Modeling," by Williams et al., SPE 89974 (September 2004); and U.S. Pat. No. 6,106,561 issued to Farmer and assigned to Schlumberger Technology Corporation.

Figure 4:
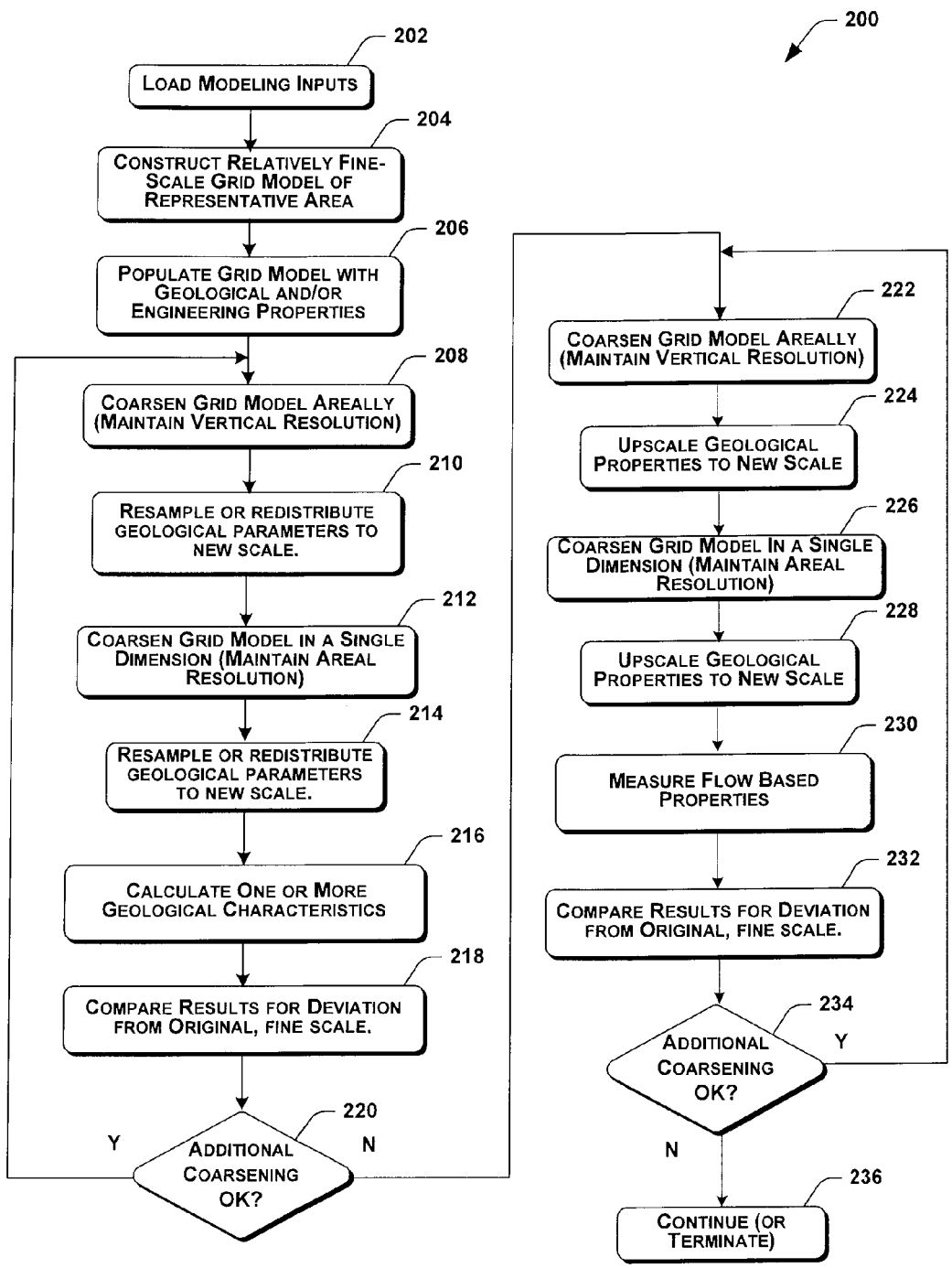
FIG. 4 is a flowchart of an embodiment of an exemplary coarsening process that may be performed by a reservoir modeling package in accordance with the teachings of the present disclosure.

FIG. 4 is a flowchart of an embodiment of an exemplary coarsening process 200 that may be performed by the reservoir modeling package 150 in accordance with the teachings of the present disclosure. In some embodiments, the process 200 includes loading the inputs necessary for modeling at 202. For example, the inputs loaded at 202 may include well data (e.g. deviations, logs), surface data, empirical data (if any), or any other suitable modeling inputs. At 204, a relatively fine scale grid model of a desired area is constructed. For example, in some implementations, the cells of the fine scale grid model may be sized for use with a geological model (e.g. 25 m×25 m×0.5 m) of a desired area or volume. The fine scale grid model may be populated with geological properties or engineering properties (or both) at 206.

Figure 5:
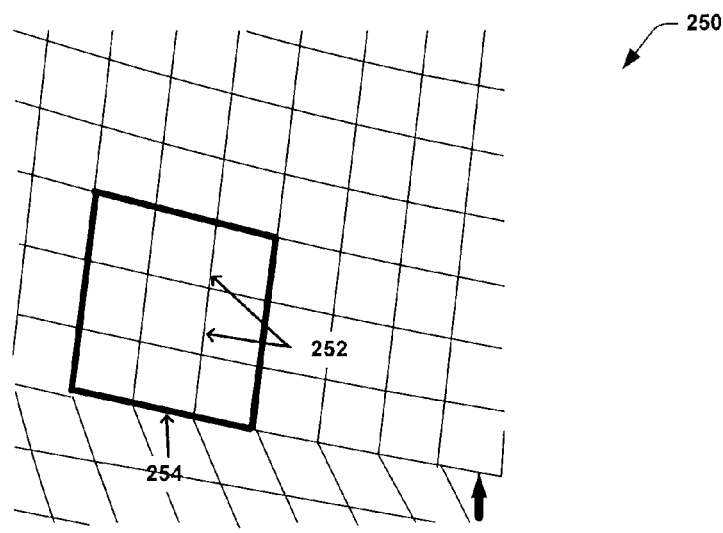
FIG. 5 is an elevational view of a representative example of an areal coarsening in accordance with the teachings of the present disclosure.

The fine scale grid model is areally coarsened at 208. More specifically, the density of cells within a two-dimensional sheet of grid points is decreased by a selected factor or fraction. For example, FIG. 5 shows a representative example of areal coarsening within a two-dimensional sheet of grid points 250. In this representative example, a plurality of fine grid cells 252 (nine in this example) are areally coarsened into a single coarse grid cell 254. Of course, in alternate implementations, any other number of find grid cells 252 may be areally coarsened into a single coarse grid cell 254.

During the areal coarsening (at 208), the resolution of the grid model in a third direction may be maintained (held constant). For example, in some embodiments, the grid points within the approximately horizontal sheets of grid points are coarsened, while the resolution of the grid points in the vertical direction are maintained. At 210, the geological parameters are resampled (or redistributed) to the new scale provided by the areal coarsening at 208. For example, in some implementations, the resampling (at 210) may include populating the coarsened grid model with one or more properties (e.g. permeability) using averaging (or other arithmetic manipulation) or using flow-based means, or both, based on one or more corresponding properties from the initial, fine scale model. In some embodiments, resampling and redistribution operations may advantageously preserve the reservoir contrasts. More specifically, they may relate to properties by rock type and may not average at boundaries between rock types. Where the coarse cell contains multiple rock-types, for example, the resampling may use only properties relating to the rock property occupying the largest volume fraction of the cell when calculating the averaged properties to assign to that cell. Thus, as noted above, the coarsening and resampling operations may advantageously provide improved preservation of the details of the underlying geological structure (e.g. rock type, etc.) over alternate techniques.

As further shown in FIG. 4, the grid model is coarsened in the remaining direction at 212. More specifically, the density of cells in the remaining direction is decreased by a selected factor or fraction. During the single-dimension coarsening at 212, the resolution of the grid model in the areal coarsening dimensions is maintained (held constant). In some implementations, the grid points in an approximately vertical direction are coarsened at 212 while the approximately horizontal sheets of grid points are maintained. At 214, the one or more properties (e.g. geological parameters) are again resampled (or redistributed) to the new scale provided by the single-dimension coarsening at 212, which again may include averaging (or other arithmetic manipulation) or using flow-based means, or both, based on one or more corresponding properties from the initial, fine scale model.

At 216, the process 200 further includes calculating one or more geological variables or characteristics using the properties associated with the most recently coarsened version of the grid. For example, in some implementations, a vertical permeability Kv is calculated from a geological permeability ratio concept (vertical permeability Kv over horizontal permeability Kh), as well as from the upscaled values determined by the grid coarsening actions at 208 through 214. Other geological variables or characteristics which may be calculated at 216 may include, for example, hydrocarbon in place, sand (or facies), NetGross fraction, rock type classes/fractions, Kv, or any other suitable variables. In further embodiments, the geologic variables computed at 216 may include dynamic properties.

The results of the calculations (at 216) are compared with the corresponding properties or characteristics of the fine scale grid model at 218. A determination is made at 220 whether additional coarsening of the grid is warranted. In some implementations, the determination at 220 is based on comparisons between one or more indicators calculated using the original, fine scale grid model and corresponding parameters calculated using the most recent version of the coarsened grid model.

At some point, the grid coarsening and resampling actions at 208 through 214 result in one or more of the calculated indicators drifting away (or diverging) from the fine scale model, indicating a practical or acceptable limit of geological coarsening. In some implementations, the acceptable limit of divergence (or drifting away) may largely be a qualitative point since different geological environments will have different drivers. Alternately, in some implementations, the acceptable limit of divergence may be a quantitative assessment. Until the acceptable limit of divergence of geological characteristics is reached at 220, however, the process 200 repeats the above-described grid coarsening and resampling actions at 208 through 214.

With continued reference to FIG. 4, once it is determined at 220 that additional coarsening and resampling actions (at 208 through 214) are not acceptable, the process 200 then proceeds to a series of additional coarsening and upscaling actions. More specifically, at 222, the grid is additionally areally coarsened by further decreasing the density of cells within a two-dimensional sheet of grid points. As described above, during the additional areal coarsening (at 222), the resolution of the grid model in the third direction may be held constant.

At 224, the geological parameters are upscaled to the new scale grid model provided by the additional areal coarsening at 222. For example, in some implementations, the upscaling (at 224) may include averaging or flow-based techniques (or both) from the previous-scale model. The upscaling of the geological parameters performed at 224 differs from the resampling of properties performed at 210 above. Specifically, the upscaling applies the averaging over the entire fine cell set that are incorporated in the coarse cell, where contrasts existed (for example between rock types) in the fine-scale model, these are smoothed in generating the coarse cell value and contrasts may not be maintained as precisely as during resampling operations. Again, as noted above, the successive coarsening and upscaling operations may advantageously emphasize preservation of volumetric properties.

Next, the grid model is additionally coarsened in the single or remaining direction at 226. As described above, during the additional single-dimension coarsening at 226, the resolution of the grid model in the areal coarsening dimensions may be maintained (held constant).

Again, at 228, the geological parameters are upscaled to the new scale provided by the single-dimension coarsening at 226. In some implementations, the upscaling at 228 may include averaging or flow-based means (or both) from the previous-scale model.

The process 200 further includes computing (or "measuring") one or more flow based properties or characteristics at 230 using the most recently coarsened version of the grid, and comparing the computed flow based properties with the corresponding flow based properties determined using the fine scale grid model at 232. For example, in some implementations, the flow based properties calculated at 230 (and compared at 232) may include pressure, time of flight, or any other suitable variables or flow based characteristics.

A determination is made at 234 whether additional coarsening of the grid is warranted. In some implementations, the determination at 234 is based on comparisons between one or more flow based indicators calculated using the original, fine scale grid model and corresponding parameters calculated using the most recent version of the coarsened grid model. At some point, the grid coarsening and upscaling actions at 222 through 228 result in one or more of the calculated flow based indicators drifting away (or diverging) from the fine scale model, indicating a practical or acceptable limit of coarsening. As described above, the acceptable limit of divergence (or drifting away) may be a qualitative point since different geological environments will have different drivers. Alternately, in some implementations, the acceptable limit of divergence may be a quantitative assessment. Until the acceptable limit of divergence of flow based characteristics is reached at 234, however, the process 200 repeats the above-described additional grid coarsening and upscaling actions at 222 through 228. When the acceptable limit of additional coarsening is reached (at 234), an acceptably coarsened or upscaled grid model suitable for reservoir simulations has been achieved, and the process 200 may continue to other operations (or terminate) at 236.

In some implementations, coarser grids may loop over a fine grid of, for example, 25 m×25 m×6" cell size, areally coarsening to, for example, 75 m×75 m, 125 m×125 m, 175 m×175 m, 275 m×275 m, 325 m×325 m, 375 m×375 m, 425 m×425 m, and so forth. In further implementations, any suitable grid resolution or size steps may be used depending on the particular features of the geological model. For each areal resolution, a series of vertical resolution coarsens may also be undertaken, scaling up progressively from the fine. These vertical steps can either be regular, as would typically be undertaken areally, or irregular based on other technology commonly employed to honor vertical flow units or barriers.

Furthermore, in some implementations, the fine scale model may be based on a representative three-dimensional (3D) sector, and the above-described workflow or processes may be performed on different sectors to properly take into account significant facies or property variation over the reservoir. Comparisons of each scale of the production profiles may be performed, ideally between two real wells, but can as easily be an aquifer and a producer, or dummy wells, comparing various characteristics of interest, including water breakthrough time, well productivity, pressure, as well as static properties such as hydrocarbon in place, sand (or facies) percentages, net: gross fractions, rock-type class percentages, cross plot of vertical to horizontal permeability, and any other suitable variables or properties. Inspection of the comparison plots will indicate at which point the geological characteristics are lost, which may be indicated by, for example, the sand percentage, kv crossplot, and rock typing plots, and possibly to a lesser extent the hydrocarbon in place.

As noted above, in some implementations, systems and methods in accordance with the present disclosure may begin with a relatively fine scale geological model, perform an initial set of coarsening and resampling operations until the geological properties of the coarsened grid model begins to "drift away" or diverge from the fine scale model, and then perform additional coarsenings and upscaling operations from the previously coarsened grid model (rather than the underlying fine scale model). In some implementations, the coarsening operations are performed by successive areal coarsenings (while holding a third dimensional spacing constant) and single dimensional coarsenings (while holding the areal coarseness constant).

Techniques described in the present disclosure may advantageously be used to determine at which scale a geo-model may properly be constructed and still retain the geological features. It is known that redistribution of the properties is currently a weakness in many geological ongoing packages that are based on the Geostatistical Software Library (GSLIB) since there may be issues with the way such packages handle a random starting point for the stochastical distributions when a grid dimension is changed. While upscaling typically results in a degree of smearing or uncertainty, embodiments in accordance with the present disclosure that initially employ coarsening and resampling operations, followed by additional coarsening and upscaling operations, may advantageously allow upscaling to be performed while still approximating the underlying geological features to an acceptable degree of uncertainty.

Embodiments of systems and methods in accordance with the teachings of the present disclosure may advantageously provide information regarding the scale at which the geological model can be constructed without losing character, while also keeping the number of cells to a minimum. Thus, embodiments in accordance with the present disclosure may allow efficient use of time and resources, permitting a user to run a greater number of simulations and to explore more of the uncertainty space with a fixed amount of resources in comparison with conventional methods. Embodiments in accordance with the present disclosure may also provide information of the scale at which the dynamic model can be constructed, and information as to which upscaling methods are most active in preserving the underlying geological characteristics, particularly of parameters such as rock types, and relative permeability parameters (endpoints). Techniques in accordance with the teachings of the present disclosure may also provide a framework for investigating advanced issues such as PVT (Pressure, Volume, Temperature) or relative permeability upscaling (e.g. liquid dropout of condensates, relative permeability pseudoisation, etc.).

It is generally known that issues may arise during grid coarsening operations that, at some point, resolution of the coarsened grid may begin to no longer capture structural features, such as faults, that may be present in the fine scale grid. For example, in some implementations, the meshes may exactly overlay such that the coarse cells completely encompass the fine cells (e.g. as shown in FIG. 5). This may be straightforward and readily implemented in the case where there are no major structural discontinuities. However, where significant structural discontinuities exist in the fine scale geological model, a conventional "pillar grid" method may set parts of the grid to be undefined in order to better approximate the reservoir structure, such as along faults and boundaries. This may mean that taking only the corners of the existing fine cells of the way across the grid may lead to a grid with gaps along boundaries or major faults, where properties may not appear under resampling. In addition, coarsening operations may cause discrepancies between grid edges and actual reservoir boundaries. If left unaddressed, these issues may result in unacceptable uncertainties, such as a sizable hydrocarbon-in-place error, due to uncertainties introduced by coarsening operations along the edges of the reservoir.

Figures 6, 7:
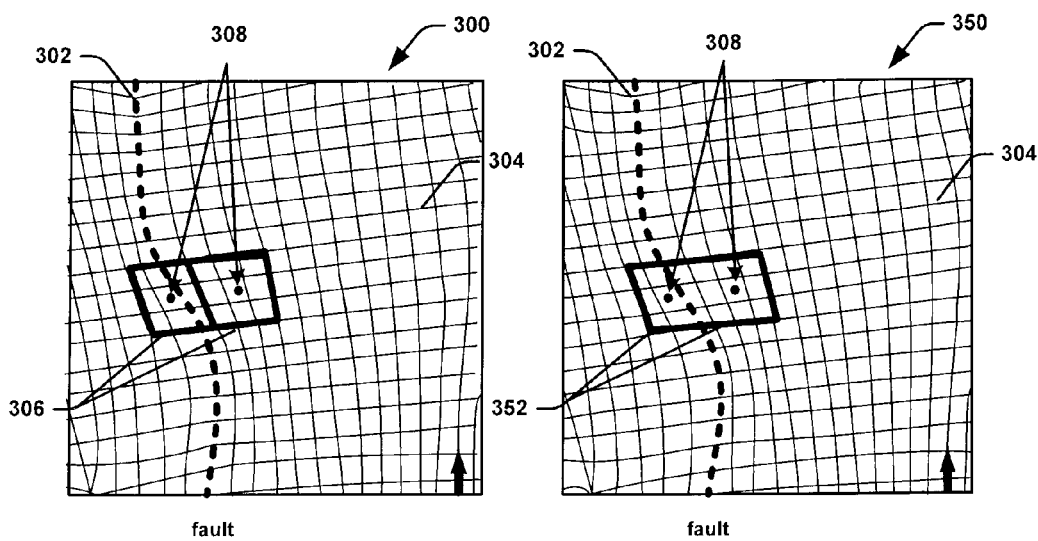
FIG. 6 illustrates a near-fault portion of a grid model subject to a conventional coarsening process.
FIG. 7 illustrates a near-fault portion of a grid model subject to a coarsening process in accordance with the teachings of the present disclosure.

For example, FIG. 6 illustrates a near-fault portion of a grid model 300 subject to a conventional coarsening process. In this example, a fault 302 (indicated by a dashed line) is modeled using a relatively fine scale mesh 304. During a conventional coarsening operation, a pair of coarse cells 306 are formed proximate the fault 302. As shown in FIG. 6, the boundaries of the coarse cells 306 do not conform with the fault 302. In addition, coarse cell properties 308 assigned to the coarse cells 306 may introduce errors by not conforming to the fault 302, or in some cases, may actually assign property values based on information obtained from the wrong side of the fault.

In some implementations, embodiments of systems and methods in accordance with the teachings of the present disclosure may at least partially address and mitigate these issues by providing improved conformance along faults and boundaries. More specifically, FIG. 7 illustrates a near-fault portion of a grid model 350 subject to a coarsening process in accordance with the teachings of the present disclosure. In this embodiment, at least one of the cell boundaries of the coarse cells 352 has been adjusted to conform to the fault 302. More specifically, in the case of a fault (e.g. fault 302), implementations in accordance with the present disclosure ensure that the sampled property (at 308) is attributed to the correct side of the fault (Value Integrity), and the coarsened cells 352 are distorted such that the fault 302 is honored rather than a simple cell boundary to protect the volume in each reservoir compartment (Volume Integrity).

In some cases, coarsening can lead to a problem where the rules of cell distortion result in the same cell face in the coarse grid corresponding to two different faults (and so there are two different throws on the same fault, which cannot be supported). In such cases, Value Integrity may be employed to ensure that a center of the coarse cell 352 lies in the correct reservoir compartment, and the appropriate fault is taken, the other being truncated at that cell or split so that it exists before and after the problem cell face.

In addition, conformance to a fine grid at a reservoir boundary may come from the same principles as the Value Integrity and Volume Integrity described above for full conformance. At a reservoir boundary, it may be the case that the boundary does not conform exactly to a cell edge of the coarse cell representation. A simple coarsening may then result in a cell edge that is "undefined" and hence no properties would appear for that cell, effectively moving the boundary inwards and reducing the total volume described by the reservoir model.

Implementations in accordance with the teachings of the present disclosure may alter the shape of a coarse cell to conform more closely to the boundary (Volume Integrity), or may add an additional coarse cell to conform to the boundary. In some implementations, when a fine cell that would provide the properties for a coarse cell exists (Value Integrity), an additional cell is created, while in other implementations the existing coarse cell is distorted to better capture the volume.

Figure 8:
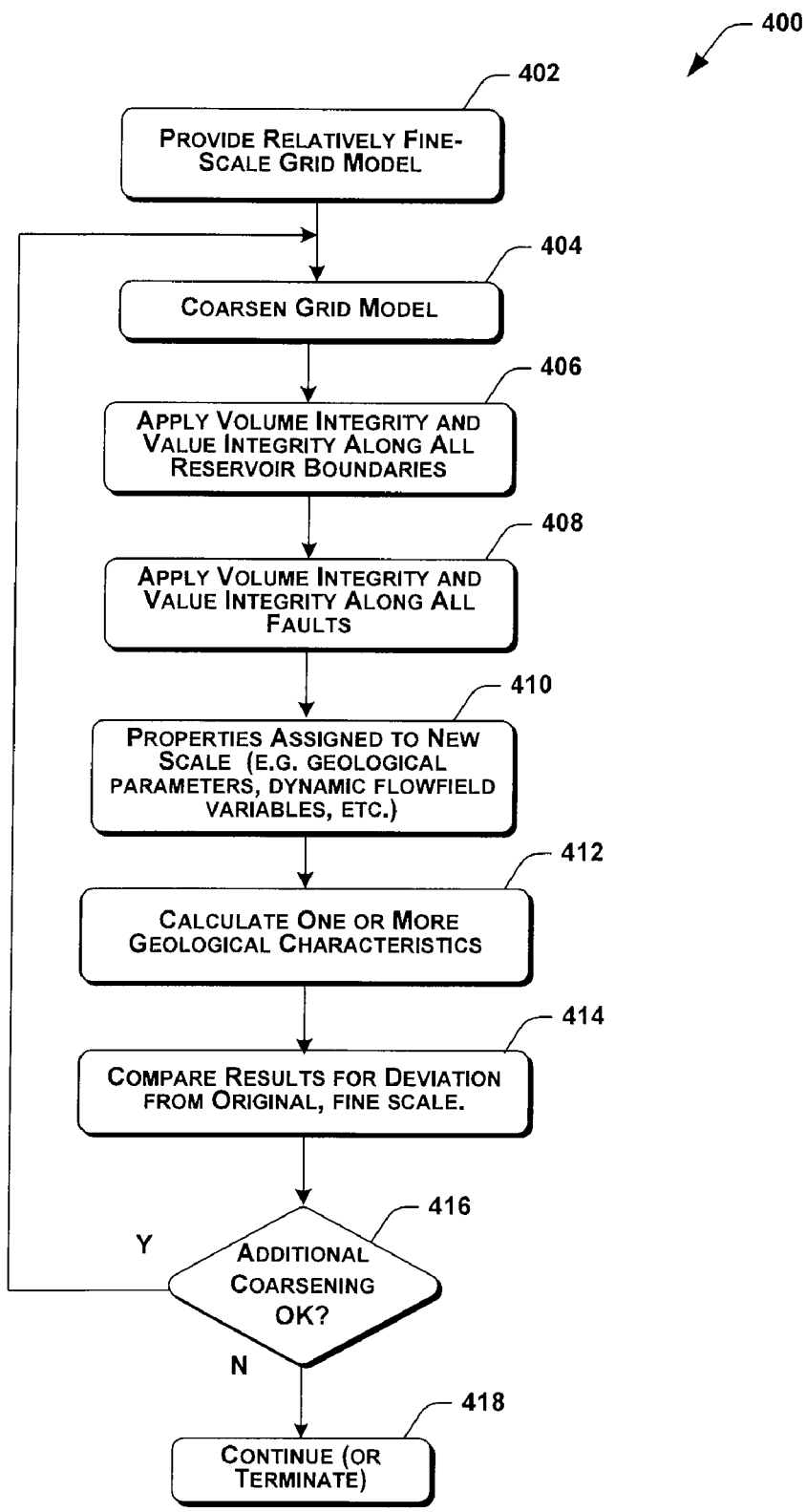
FIG. 8 is a flowchart of an exemplary coarsening process that includes fault conformance and boundary conformance aspects in accordance with the teachings of the present disclosure.

FIG. 8 is a flowchart of an exemplary coarsening process 400 that includes fault conformance and boundary conformance aspects in accordance with the teachings of the present disclosure. In this embodiment, the process 400 includes providing a relatively fine scale grid model at 402. This may include, for example, generating and populating a grid model from scratch, or reading in a pre-existing, previously created geological model. At 404, the fine scale grid model may be coarsened, and the above described rules for Volume Integrity and Value Integrity are applied along all reservoir boundaries at 406.

Similarly, at 408, the above described rules for Volume Integrity and Value Integrity are applied along with all faults existing within the model. Properties, such as geological parameters and dynamic flow field parameters, are assigned to the new coarse scale grid at 410. In some implementations, the assigning properties to the new coarse scale grid may include resampling (or redistribution), upscaling, both resampling and upscaling, or any other suitable assigning operations.

As further shown in FIG. 8, one or more geological or flowfield characteristics may be calculated at 412. These calculations are compared to the original fine scale model at 414. At 416, a determination is made whether additional coarsening is acceptable. The determination (at 416) may be performed using any suitable criteria, including, for example, the divergence or "drifting away" criteria described above respect to FIG. 4.

If it is determined that additional coarsening is warranted (at 416), then the process 400 repeats the coarsening and assigning operations 404 through 416, including the application of the Volume Integrity and Value Integrity rules along boundaries and faults, indefinitely until grid coarsening is no longer warranted or acceptable. Once grid coarsening is no longer acceptable, the process 400 continues to other operations or terminates at 418.

Figure 9:
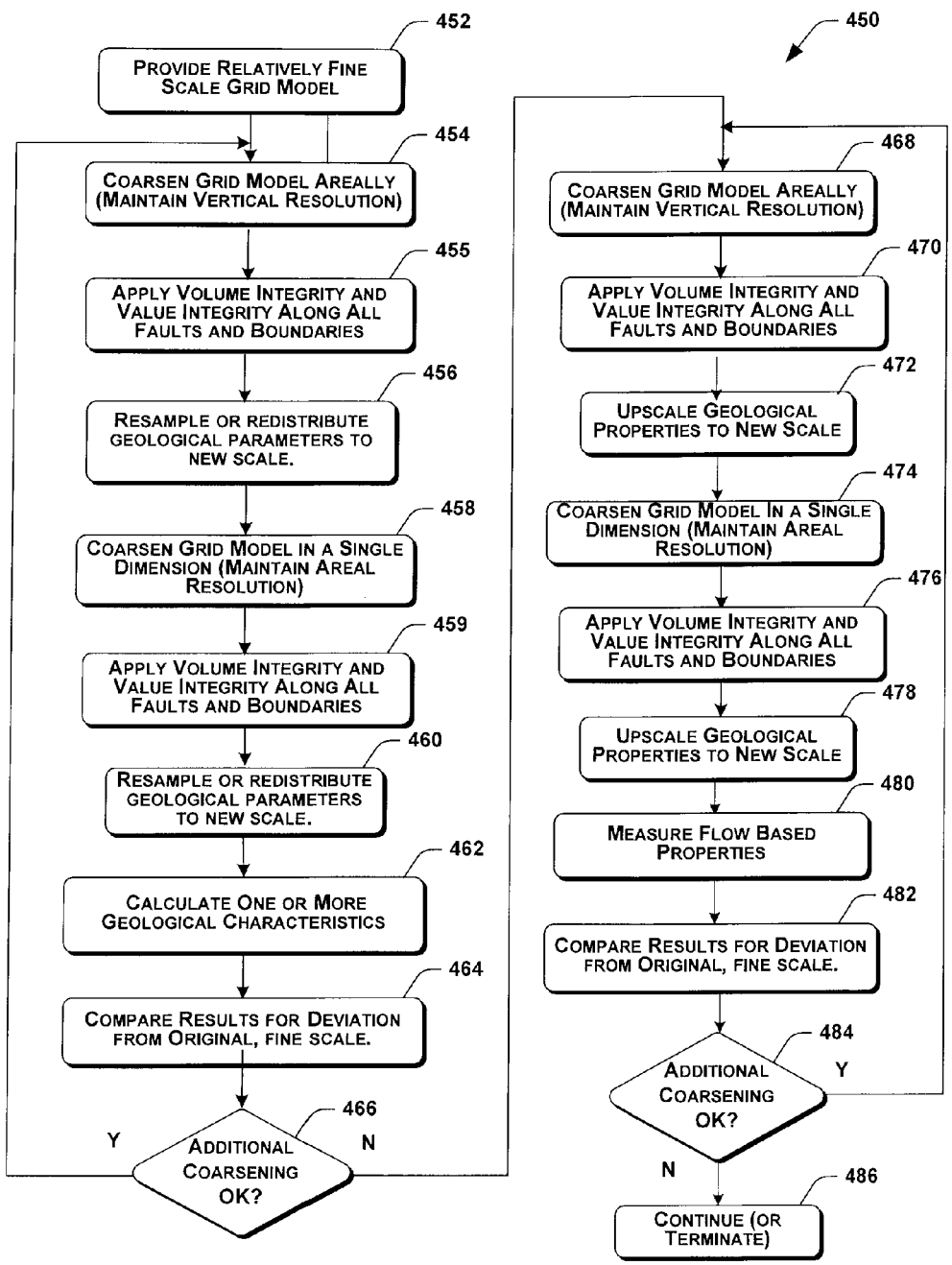
FIG. 9 is a flowchart of another embodiment of an exemplary coarsening process in accordance with the teachings of the present disclosure.

It will be appreciated that the above noted procedures for Volume Integrity and Value Integrity may be combined or integrated with other grid coarsening rules and procedures. More specifically, in some implementations, the procedures for Volume Integrity and Value Integrity may be integrated with the coarsening procedures described above with respect to FIG. 4. For example, FIG. 9 is a flowchart of another embodiment of an exemplary coarsening process 450 in accordance with the teachings of the present disclosure. It will be appreciated that many of the operations involved in the coarsening process 450 are substantially similar to those described above respect to the coarsening process 200 shown in FIG. 4, and therefore, only a brief description of such operations will be provided for the sake of brevity.

In this embodiment, the process 450 includes providing a relatively fine scale grid model at 452. The provision of the relatively fine scale grid model (at 452) may include, for example, generating and populating a grid model from scratch, or inputting a pre-existing, previously created model. In some implementations, the cells of the fine scale grid model may be sized for use with a geological model (e.g. 25 m×25 m×0.5 m, 25 m×25 m×6", etc.) of the desired volume.

At 454, the grid model is areally coarsened by decreasing the density of cells within a two-dimensional sheet of grid points (e.g. by a selected factor or fraction). During the areal coarsening (at 454), the resolution of the grid model in a third direction may be maintained (held constant). The Volume Integrity and Value Integrity procedures are applied along all faults and boundaries of the areal coarsening dimensions at 455. At 456, the geological parameters are resampled (or redistributed) to the new scale provided by the areal coarsening at 454.

As further shown in FIG. 9, a single directional coarsening in the remaining direction is performed at 458, during which the resolution of the grid model in the areal coarsening dimensions may be maintained (held constant). The Volume Integrity and Value Integrity procedures are applied along all faults and boundaries of the single directional coarsening dimension at 459. At 460, the geological parameters are resampled (or redistributed) to the new scale provided by the single dimensional coarsening at 458.

The process 450 further includes calculating one or more geological variables or characteristics using the most recently coarsened version of the grid at 462. The results of the calculations (at 462) are compared with the corresponding geological variables and properties of the fine scale grid model at 464, and at 466, a determination is made whether additional coarsening of the grid is warranted. In some implementations, the determination at 466 is based on a qualitative assessment (or quantitative, or both) as to whether the results of the coarsening and resampling operations have unacceptably diverged or drifted away from those of the fine scale model. If it is determined at 466 that additional coarsening is acceptable, the process 450 returns to the coarsening and resampling operations (454 through 464) and repeats those operations until additional coarsening is no longer acceptable.

Next, the process 450 begins a series of coarsening and upscaling operations. More specifically, the grid model is additionally areally coarsened at 468, and the Volume Integrity and Value Integrity procedures are applied along all faults and boundaries of the areal coarsening dimensions at 470. At 472, the geological parameters are upscaled to the new scale from the previously coarsened grid model (resulting from operations 452 through 466).

A single directional coarsening in the remaining direction is performed at 474, during which the resolution of the grid model in the areal coarsening dimensions may be maintained (held constant). Again, the Volume Integrity and Value Integrity procedures are applied along all faults and boundaries of the single directional coarsening dimension at 476. At 478, the geological parameters are upscaled to the new scale from the previously coarsened grid model. The process 450 further includes "measuring" or calculating one or more geological variables or characteristics using the most recently coarsened version of the grid at 480, and comparing the measurements with the corresponding geological variables and properties of the fine scale grid model at 482.

A determination is made at 484 whether additional coarsening of the grid is warranted. In some implementations, the determination at 484 may be based on a qualitative assessment (or quantitative, or both) as to whether the results of the coarsening and upscaling operations have unacceptably diverged or drifted away from those of the fine scale model. If it is determined at 484 that additional coarsening is acceptable, the process 450 returns to the coarsening and upscaling operations (468 through 482) and repeats those operations until additional coarsening is no longer acceptable. Upon determining (at 484) that additional grid coarsening is no longer acceptable, the process 450 continues to other operations or terminates at 486.

CONCLUSION

Although embodiments of systems and methods for right sizing reservoir models have been described in language specific to structural features and/or methods, it is to be understood that the subject of the appended claims is not necessarily limited to the specific features or methods described. Rather, the specific features and methods are disclosed as exemplary implementations of integrating data-driven modeling and knowledge into a self-improving reasoning tool.

What is claimed is:

1. A method of coarsening a three dimensional grid model having a plurality of cells, each cell having one or more properties associated therewith, the method comprising:
iteratively performing, by a computer processor, a first set of operations, the first set of operations including at least one areal coarsening operation, at least one sampling operation, at least one vertical direction coarsening operation, and at least one determining operation, wherein:
each successive areal coarsening operation reduces a number of cells in a horizontal sheet while maintaining vertical resolution to provide a successively coarsened grid model;
each successive resampling operation populates cells of the successively coarsened grid model with the one or more properties by sampling the one or more properties associated with the initial three dimensional grid model;
each vertical direction coarsening operation reduces a number of cells in the vertical direction while maintaining areal resolution to provide a successively coarsened grid model; and
each successive determining operation determines whether to continue iteratively performing the first set of operations based on a comparison of one or more characteristics of the successively coarsened grid model with one or more corresponding characteristics of the initial three dimensional grid model; and iteratively performing, by the computer processor and in response to the comparison not being acceptable, a second set of operations, the second set of operations including at least one additional coarsening operation, at least one upscaling operation, and at least one additional determining operation, wherein:

each successive additional coarsening operation reduces a number of cells in the grid model to provide an additionally coarsened grid model;

each successive upscaling operation populates cells of the additionally coarsened grid model with the one or more properties by upscaling the one or more properties from a prior coarsened grid model; and each successive additional determining operation determines whether to continue iteratively performing the second set of operations based on a second comparison of one or more characteristics of the additionally coarsened grid model with one or more corresponding characteristics of the prior coarsened grid model.

2. The method of claim 1, wherein at least one of the sampling operations of the first set of operations, or the upscaling operations of the second set of operations, includes:
at least one of an averaging operation, or an operation based on a flow-based means.

3. The method of claim 1, wherein the determining operation of the first set of operations includes:
assessing whether the one or more characteristics of the additionally coarsened grid model have diverged from the one or more corresponding characteristics of the initial three dimensional grid model by an unacceptable amount.

4. The method of claim 1, wherein the additional determining operation of the second set of operations includes:
assessing whether the one or more characteristics of the additionally coarsened grid model have diverged from the one or more corresponding characteristics of the prior coarsened grid model by an unacceptable amount.

5. The method of claim 1, wherein at least one of the first set of operations or the second set of operations further includes:
adjusting one or more cell sizes to conform with at least one of a fault or a boundary in accordance with at least one of a volume integrity requirement or a value integrity requirement.

6. The method of claim 1, wherein adjusting one or more cell sizes to conform with at least one of a fault or a boundary in accordance with at least one of a volume integrity requirement or a value integrity requirement includes:
determining that a cell face corresponds with two different faults; and
at least one of truncating one of the faults at the cell face, or splitting one of the faults at the cell face so that the one of the faults exists before and after the cell face.

7. One or more non-transitory computer-readable media containing computer readable instructions that, when executed by a computer, performing a method of coarsening a three dimensional grid model having a plurality of cells, each cell having one or more properties associated therewith, the method comprising:
generating a coarsened grid model by:
reducing, during an areal coarsening operation, a number of cells in a horizontal sheet while maintaining vertical resolution; and
reducing, during a vertical coarsening operation, a number of cells in a vertical direction while maintaining areal resolution;

sampling the one or more properties associated with the initial three dimensional grid model to populate the cells of the coarsened grid model with the one or more properties;

determining whether to repeat the coarsening and sampling operations based on a comparison of one or more characteristics of the coarsened grid model with one or more corresponding characteristics of the initial three dimensional grid model;

additionally coarsening the grid model, in response to the comparison not being acceptable, to provide an additionally coarsened grid model;

upscaling the one or more properties associated with a prior coarsened grid model to populate the cells of the additionally coarsened grid model with the one or more properties; and determining whether to repeat the additionally coarsening and upscaling operations based on a second comparison of one or more characteristics of the additionally coarsened grid model with one or more corresponding characteristics of the prior coarsened grid model.

8. The one or more non-transitory computer-readable media of claim 7, wherein the method further comprises:
adjusting one or more cell sizes to conform with at least one of a fault or a boundary in accordance with at least one of a volume integrity requirement or a value integrity requirement.

9. The one or more non-transitory computer-readable media of claim 7, wherein the method further comprises:
determining that a cell face corresponds with two different faults; and
at least one of truncating one of the faults at the cell face, or splitting one of the faults at the cell face so that the one of the faults exists before and after the cell face.

10. A system, comprising:
a processing device;
a memory operatively coupled to the processing device;
an input/output device operatively coupled to at least one of the memory or the processing device, wherein at least one of the processing device, the memory, or the input/output device are configured to:
provide a three dimensional grid model having a plurality of cells, each cell having one or more properties associated therewith;
generate a coarsened grid model by:
reducing, during an areal coarsening operation, a number of cells in a horizontal sheet while maintaining vertical resolution; and
reducing, during a vertical coarsening operation, a number of cells in a vertical direction while maintaining areal resolution;
sample the one or more properties associated with the initial three dimensional grid model to populate the cells of the coarsened grid model with the one or more properties;
calculate whether to repeat the coarsen and sample operations based on a comparison of one or more characteristics of the coarsened grid model with one or more corresponding characteristics of the initial three dimensional grid model;
additionally coarsen the grid model, in response to the comparison not being acceptable, to provide an additionally coarsened grid model;
upscale the one or more properties associated with a prior coarsened grid model to populate the cells of the additionally coarsened grid model with the one or more properties; and calculate whether to repeat the additional coarsen and upscale operations based on a second comparison of one or more characteristics of the additionally coarsened grid model with one or more corresponding characteristics of the prior coarsened grid model.

11. The system of claim 10, wherein at least one of the processing device, the memory, or the input/output device are further configured to:
   adjust one or more cell sizes to conform with at least one of a fault or a boundary in accordance with at least one of a volume integrity requirement or a value integrity requirement.

12. The system of claim 10, wherein at least one of the processing device, the memory, or the input/output device are further configured to:
   determine that a cell face corresponds with two different faults; and
   at least one of truncate one of the faults at the cell face, or split one of the faults at the cell face so that the one of the faults exists before and after the cell face.

* * * * *